(12) United States Patent
Rashid et al.

(10) Patent No.: US 7,134,084 B1
(45) Date of Patent: Nov. 7, 2006

(54) CONFIGURATION OF DISPLAYS FOR TARGETED USER COMMUNITIES

(75) Inventors: Fuad Rashid, San Mateo, CA (US); Jesse Ambrose, San Jose, CA (US); Domingo Mihovilovic, Menlo Park, CA (US); Peter Thorson, Oakland, CA (US); Anil Mukundan, San Jose, CA (US)

(73) Assignee: Siebel Systems, Inc., San Mateo, CA (US)

( * ) Notice: Subject to any disclaimer, the term of this patent is extended or adjusted under 35 U.S.C. 154(b) by 664 days.

(21) Appl. No.: 09/884,739

(22) Filed: Jun. 18, 2001

(51) Int. Cl.
*G06F 3/00* (2006.01)
*G06F 15/00* (2006.01)

(52) U.S. Cl. .................. 715/762; 715/908; 715/506

(58) Field of Classification Search ............... 345/760, 345/762–763, 700; 715/505–508, 513, 501.1, 715/517–524, 760, 762–763, 908, 700
See application file for complete search history.

(56) References Cited

U.S. PATENT DOCUMENTS

| | | | | |
|---|---|---|---|---|
| 5,845,299 A | * | 12/1998 | Arora et al. ................ | 715/513 |
| 5,956,736 A | * | 9/1999 | Hanson et al. .............. | 715/513 |
| 6,493,733 B1 | * | 12/2002 | Pollack et al. .............. | 715/513 |
| 6,581,061 B1 | * | 6/2003 | Graham ....................... | 707/10 |
| 6,684,369 B1 | * | 1/2004 | Bernardo et al. ........... | 715/513 |
| 2002/0023111 A1 | * | 2/2002 | Arora et al. ................ | 707/513 |
| 2002/0023112 A1 | * | 2/2002 | Avital ......................... | 707/513 |
| 2002/0046245 A1 | * | 4/2002 | Hillar et al. ................ | 709/205 |
| 2002/0194219 A1 | * | 12/2002 | Bradley et al. ............. | 707/506 |

* cited by examiner

*Primary Examiner*—Sy D. Luu
(74) *Attorney, Agent, or Firm*—Campbell Stephenson Ascolese LLP

(57) ABSTRACT

A method and apparatus is provided to generate a plural number of differing data displays, each based upon a multi-information display template that has the information to drive each separate data display. Each data display may be different as regards selected information to appear on each data display, selected placement of the information on each data display depending upon a selected and defined style, an at least one selected and defined mode of information to appear on any one data display, and the utilization of specific display program capabilities (such as a browser). Additionally, a method and apparatus is provided for a user to enter the information into a computing system, and for the computing system to generate the multi-display template.

51 Claims, 9 Drawing Sheets

CONFIGURATION OF DISPLAYS FOR TARGETED USER COMMUNITIES

TECHNICAL FIELD

This disclosure relates generally to computer implemented databases, and particularly but not exclusively relates to building a template for defining a plurality of distinct display images based on the template.

BACKGROUND

Present-day database display systems are often required or preferred to display the same information in differing placements or orderings, to display differing amounts of information from the same database, or to drive browsers having differing display capabilities and characteristics, from the same database. These differing display attributes may each be for use by a different user, or for use by a same user, each having a varying display format, information content, or browser characteristic.

A particular deployment is in enterprise-class database display systems that often involve complicated and voluminous information relating illustratively to marketing, inventory, or to business process information needs. Each information need has a differing display requirement in terms of both the inclusion of specific data base information in the information display, and of the placement of that information on a display device. Moreover, this information may be for display on a network connected terminal, wherein the information is displayed according to any of a plurality of possible browser characteristics, such as a markup language.

Illustrative of the different user display requirements, a first user may require a display of data base fields that includes a presentation of transaction activity for a one month time period, while a second user may require a display of a similarly formatted presentation of transaction activity but for a one year period. Or a third user may require a presentation of inventory for parts "A" and "B", while a fourth user may require a similarly formatted presentation of inventory but for parts "A", "B", and additionally part "C". Or a fifth user may require a first display placement (or ordering) of a set of information, while a sixth user may require a second differing display placement of the same set of information, for instance an information display requiring, because of language of cultural differences, a person's name to be in a Surname—Given Name placement in one display presentation, and the same name information but in a Given Name—Surname placement in another display presentation. Or a seventh user may display the information for processing by a browser that has a characteristic that includes supporting framing, while an eighth user may display the information for processing by a browser that has a differing characteristic not supporting framing.

Conventional database display systems and methods include display templates that define the specific database information to be displayed, and a placement of the information for a specific browser characteristics. However, these templates do not respond to dynamic user requests for a display of the same information in differing formats, differing amounts of information in a same format, or information appropriate for a differing browser display characteristic; and do not permit the same template to define a plural number of displays having the same information in differing formats, differing amounts of information in a same format, or information appropriate for a plural number of browser display characteristics.

Conventional database display systems and methods separately configure each display for each separate set of display attributes, resulting in alternatively a preferred or even required display not being available, or both a development and/or a maintenance time expenditure, for a changed information display no matter how small the change, compared to the nominal information display.

There is a need for a display system and method to generate views based on the same information in differing formats, differing amounts of information in a same format, and information appropriate for differing browsers.

There is a need for a database display system and method that both dynamically responds to a user request for a modified information display that portrays information according to differing display attributes, and configures a display according to the differing display attributes from the information data base.

There is a need that a same display template support each of these differing display attributes and user requests, so that the database system does not need a large number of separate templates to display fundamentally related display information resulting in having only one configuration to build and to maintain.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

One skilled in the relevant art will recognize, however, that the invention can be practiced without one or more of the specific details, or with other steps, methods, systems, components, etc. In other instances, well-known structures, materials, system components, or steps of methods are not shown or described in detail to avoid obscuring aspects of the invention. The order of description should not be construed as to imply that these operations are necessarily order dependent.

DETAILED DESCRIPTION OF THE ILLUSTRATED EMBODIMENTS

Embodiments of a system and method for building a data display from a database according to a plurality of user requested data placement, data inclusion, and browser characteristics are described herein. In the following description, numerous specific details are provided, to provide a thorough understanding of embodiments of the invention. One skilled in the relevant art will recognize, however, that the invention can be practiced without one or more of the specific details, or with other steps, methods, systems, components, materials, etc. In other instances, well-known structures, materials, system components, or steps of methods are not shown or described in detail to avoid obscuring aspects of the invention.

Reference throughout this specification to "one embodiment" or "an embodiment" means that a particular feature, structure, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, steps, or characteristics may be combined in any suitable manner in one or more embodiments.

An embodiment of the present invention includes a machine readable medium to store a computing program and data. A machine readable medium includes any mechanism that provides (i.e. stores and/or transmits) information in a form readable by a machine such as a computer. For example, a machine readable medium includes, and is not limited to, read only memory (ROM); random access memory (RAM); magnetic disk storage media; optical storage media; flash memory devices; electrical, optical, acoustical or other form of propagated signals (such as carrier waves, infrared signals, digital signals, and so forth), or any type of media suitable for storing electronic instructions or data.

Various operations will be described as multiple discrete steps performed in turn in a manner that is most helpful in understanding the present invention. However, the order of description should not be construed as to imply that these operations are necessarily order dependent, in particular, the order the steps are presented. Any necessary ordering is alternatively expressly mentioned or will be understood by those skilled in the art.

Figure 1:
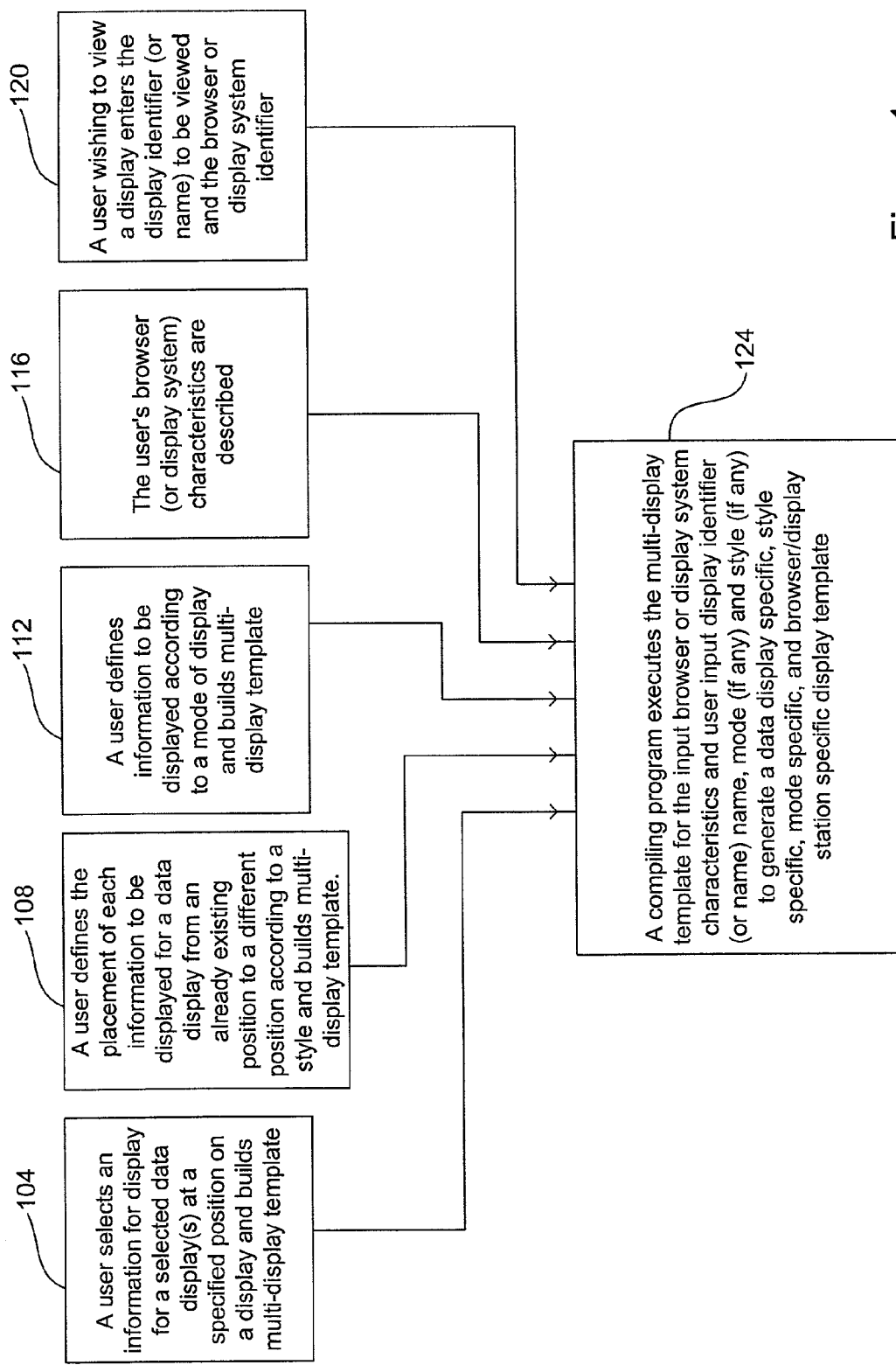
FIG. 1 portrays a flow chart of an embodiment of a method of the present invention of generating a data display from a conditional multi-information display template. The order of description should not be construed as to imply that these operations are necessarily order dependent.

Referring now to FIG. 1, an embodiment includes a user defining any of the information displays (data displays) that an underlying template supports. In blocks 104, 108, 112, and 116, a user defines a content and an associated layout of display information. Preferably this is done interactively by using a displayed layout editor and selecting displayed modes by using drag and drop operations of displayed information from a database table. The user defined content and associated layout is preferably input into a multi-information display template of the present invention described with reference to FIG. 2 below. In an embodiment, a detailed method of defining the information, and a structure for affecting the change, is described with particular reference to FIGS. 2–10 below.

In block 104, a user initially defines (or selects) information to be displayed (or have a presence) in a specific information display by preferably an interactive operation on a display, such as preferably a drag and drop operation of at least one of the available information in the database table onto an interactive layout editor display position. For the drag and drop operation, the available information in the database is displayable on the display. The position of the information in the information display is preferably specified by a predefined placeholder that is displayed as a position on the information display for the drag and drop operation. Each information is defined preferably according to alternatively all information display names (identification) that an underlying multi-information display template supports, a specific information display identification that the underlying multi-information display template supports, or a negation expression that specifies that the information appears in all information displays except the specific negated information display(s) that the underlying multi-information display template supports. The all information display, specific information display, and the negation of an information display is available by preferably a selection on the display, as shall be presently described. It is within the specific contemplation of the present invention that the selection includes a Boolean expression of any combination of specific information display identifications.

In block 108, a user defines the placement of each of the information to be displayed for an information display identification as described above, from an already existing placeholder to a differing placeholder, by preferably a drag and drop operation. For a specific information display, the user preferably defines each position according to a selectable style name, or alternatively the default style name mode for the information displays supported by the multi-information display name. Here the user is not creating or deleting an information, but is instead rearranging already created informations. A specific style name is preferably named for a specific language or culture, e.g. "English" or "German" because in the inventor's contemplated usage of the present invention, each language or culture may have a specific ordering convention for otherwise the same displayed information; for instance in the ordering of a person's Surname and Given Name, in which the Surname and the Given Name can alternate in order; or in the ordering of a date's day, month, and year, in which any of the day, month, and year can alternate in order. Thus, for each display information name, the position for a style name, such as the name "English" or the name "German". The information may be in a form characterized by a display list which is considered here a vertically disposed set of information (or column of information). The information may be in a form characterized by a field which is considered here a horizontally disposed set of information (or row of information), and can also be each of the fields in a form type display. The selectable style name is available by preferably a selection on the display, as shall be presently described. It is within the specific contemplation of the present invention that the selection includes a Boolean expression of any combination of style names.

In block 112, a user defines information to be displayed for a specific information display specified above, according to a display mode, preferably one of a "more" display mode, and a "less" display mode. An information display portrays the information defined to be less mode information in both the less display mode and the more display mode; and portrays the information defined to be more mode information in only the more display mode. Accordingly, a less mode display information is a subset of a more mode display information. A user defines each mode by preferably toggling between display modes as described with reference to FIG. 9, and then all information defined in that mode is tagged for display in that mode. These modes enable a user to toggle between the modes to display more or less information (such as fields and/or lists as described above) for a given information display. The mode name is available by preferably a selection on the display, as shall be presently described. It is within the specific contemplation of the present invention that the available display modes may include more than a base mode and a more mode, and may include any number of specifically defined display modes.

In block 116, the multi-information display template includes statements that support a plurality of browser characteristics that are conditionally executed when a display template is built depending upon the browser characteristics of the browser to display an information display. Browser characteristics are preferably maintained in an .INI file in an embodiment of this invention so that when a user requests a display, the characteristics of the user's browser are found in the .INI file, and a display template appropriate for the browser is built from the multi-information display template. The following are examples of browser characteristics (or capabilities) that are pertinent at the time of the present patent application: frame support, table support, cookies allowed, scripting language support such as Visual Basic Scripting Edition (VBS script) and JavaScript, and JavaApplets. It is specifically contemplated that the present invention is not limited to this exemplary list of currently pertinent user characteristics (or capabilities) but includes all pertinent user characteristics (or capabilities).

Moreover, different browsers, and other display software, support differing markup/display languages. For instance, Wireless Application Protocol (WAP) browsers use the Wireless Markup Language (WML), and Internet Explorer™ and Netscape™ browsers both use the Hyper Text Markup Language (HTML). It is specifically within the contemplation of the present invention that different multi-information display templates, or template files, will both be built and be present for different markup languages in accordance with the specific embodiment, as described with reference to FIG. 2. The markup/display language property setting obtained from the browser or other display generation software determines which multi-information display markup/language template (or multi-information display markup/display language template (FIG. 2, 230) record according to the embodiment), is loaded both at edit time and at run time, wherein the compiling program executes the multi-information display template as described with reference to FIG. 2.

In block 120, a user wanting to view a specific information display, inputs to the system the information display identifier, and the browser (or the browser type) which may of course be done automatically as is well known to those skilled in the art, specific style name that may of course include the default mode, and display mode that may also include the default mode. In block 124, a compiling program executes on a computing system. The computing system in response to the program, translates the multi-information display template into a specific application display template depending upon the data display information, mode, style name, and browser characteristics for the browser markup language, and having the specific information from the database table.

Figure 2:
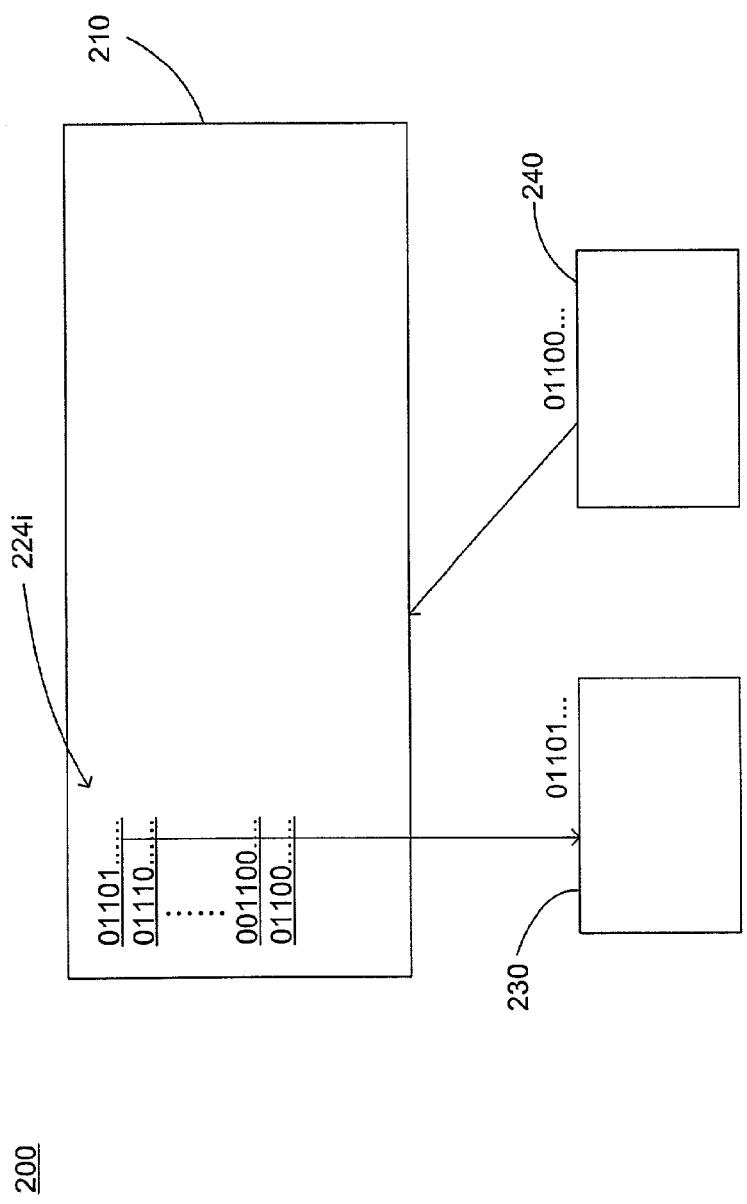
FIG. 2 portrays an embodiment of a multi-information display template file.

Referring now to FIG. 2, a multi-information display template 200 of the present invention stores each of the varying information of each information display defined with reference to FIG. 1 above. A multi-information display template is a record in memory, possibly one of many such records for a plurality of multi-information display templates, that together are stored in a common database (often called a repository). A multi-information display template 210 is to have an arrangement in memory in which the software and method to build a multi-information display template, to read a multi-information display template, and to compile a multi-information display template (i.e. to generate a display template from a multi-information display template) are each appropriate to the arrangement of the multi-information display template in memory, as is well known to those skilled in the art. Accordingly, what is described herein with reference to FIG. 2 is one embodiment of an arrangement of multi-information display template.

In the preferred embodiment of a multi-information display template 200, a record 210 stores a pointer 224*i* to each of at least one multi-information display markup/display language templates 230. There is a distinct multi-information display markup/display language template 230 for each markup/display language that the multi-information display template supports wherein each multi-information display markup/display language template 230 is to compile into a display template for a specific markup/display language. Each multi-information display markup/display language template 230 preferably references a same child table 240 as described below.

In the preferred embodiment of a data base 240 that stores the style, mode, and information placement data for each information (data) display, as described with reference to FIG. 1 and referred to herein by its preferred arrangement as a child table 240 of the multi-information display template 200, the data base child table 240 is preferably organized to include a separate information record for each specific information that has been selected for display. Each record of the same child table 240 preferably includes a pointer to the multi-information display template 200. It is within the specific contemplation of the present invention that the multi-information display template 200 and the data base 240 reference each other using other methods and mechanisms, including a pointer from the multi-information display template record 210 to the data base 240, and from each multi-information display markup/display language template 230 to the database 240.

Figure 3:
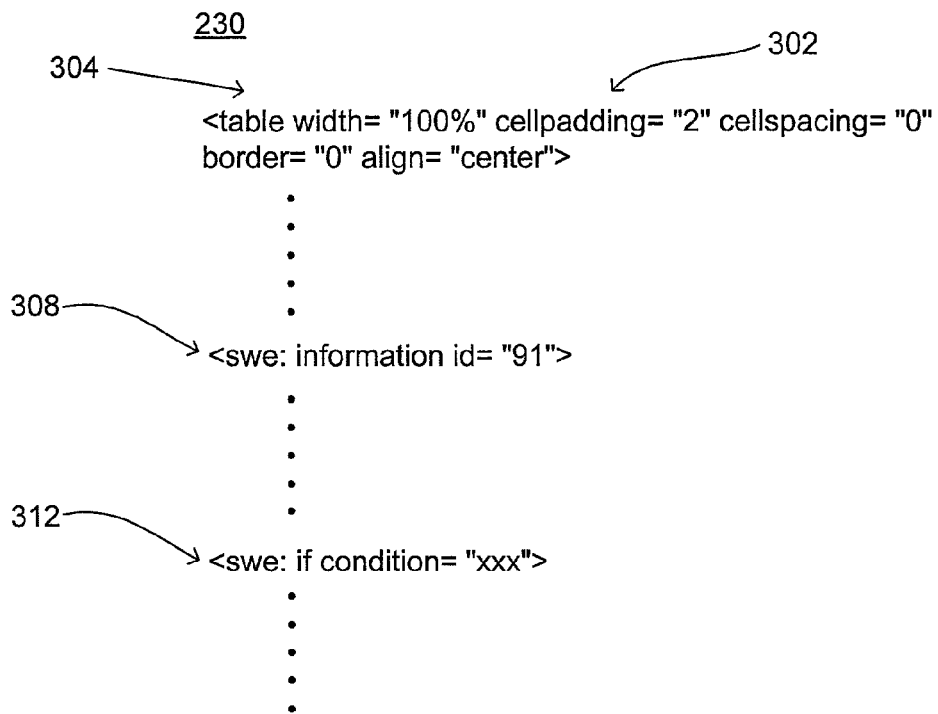
FIG. 3 portrays an embodiment of a multi-information display markup/display template of the embodiment of the multi-information display template file portrayed with reference to FIG. 2.

Referring now to FIG. 3, each multi-information display markup/display language template 230 identifies the external markup/display language statements 304 to generate a supported information display for a browser (or other display generating program) that builds a display according to the markup/display language. A multi-information display markup language template 230 includes a specification, or reference to a specification, of the position on an information display of a displayed information 308. The preferred organization of the multi-information display markup/display language template 230 is a sequence of markup/display language statements 304 that includes as position information indicators, the placeholders 308 implemented illustratively as HTML markup language tags defined with reference to FIG. 1 above. Each placeholder 308 preferably includes a character string that identifies that placeholder. In the portrayed placeholder 308, that identifying character string is "91".

Each multi-information display markup/display language template 230 further includes conditional (or contingent) statements 312 implemented illustratively as markup language tags. These contingent statements 312 are executed at run time by the compiling program if the characteristics of the user's browser/display program match the characteristics of the tag 312. The characteristics of the user's browser/display/program are obtained preferably at runtime before the compiling program executes the multi-information display template by reading an .INI file (wherein an .INI file is a file having an .ini extension indicting that it includes configuration data). The conditional tags are preferably similar to if-else statements or to the switch, case, and default statements in the C/C++ programming languages, to provide a conditional branching according to an expression that evaluates to alternatively true or false.

In the FIG. 3, associated with the placeholder 308, as well as the conditional tag 312, is character string "swe", which is an indicator in this embodiment that the enclosed characters pertain to a compiling program instruction, either a placeholder data or a conditional tag 312. An embodiment of the compiling program therefore reads the character string "swe" and interprets the character string "swe" as an indication that the remainder of the tag is an instruction to the compiling program.

Figure 4:
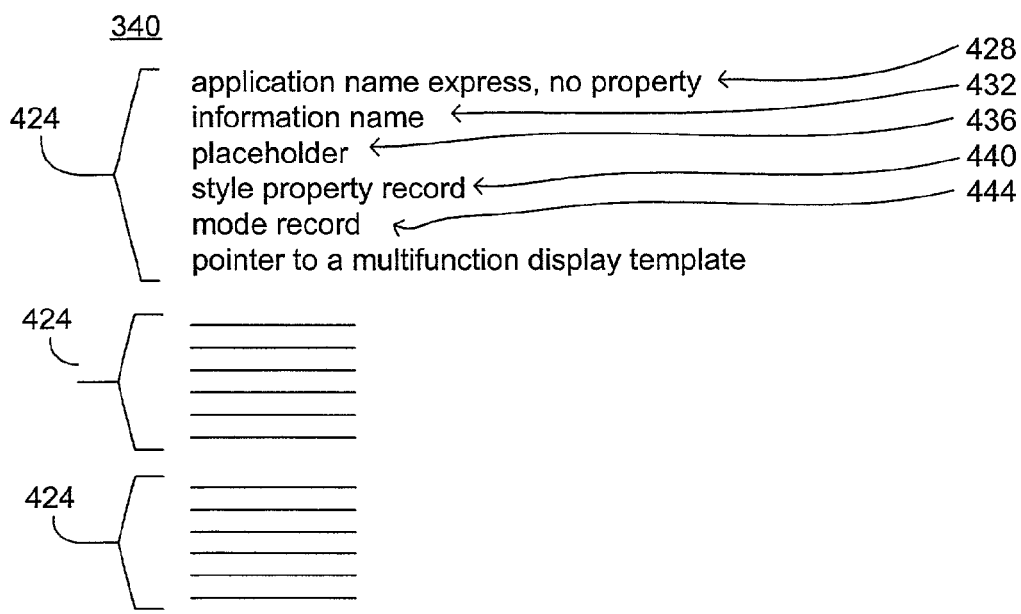
FIG. 4 portrays an embodiment of a child table to include a record for each information to be displayed by the information displays of the embodiment of the multi-information display template file portrayed with reference to FIG. 2.

Referring to FIG. 4, a child table 240 includes at least one record 424 for each information to be displayed by the information displays supported by a multi-information display template. Each record 424 (hereinafter information record) preferably includes a data information name 432. Each record information 424 preferably includes an information display identifier expression property 428 to indicate the specific information displays that the information is displayed for. The expression property functions as a search specification or query condition, limiting the display of the information to those information displays that match the expression condition when executed at runtime by the compiling program discussed with reference to FIG. 1, block 124. At runtime, the compiling program checks the information record 424 to see if there is an information display identifier expression property corresponding to the input information display identifier in order to render the multi-information display template into a specific information display template. The expression property 428 is normally blank, which means "unrestricted", that is, the information appears for all information displays supported by the multi-information display template. An at least one single information display in the expression property 428 specifies that the information appears only in the specified information display(s). At least one negation expression in the expression property 428 specifies that the information does not appear in the negated information display(s), and otherwise appears in all information displays.

Each information record 424 preferably further includes a placeholder record 436 indicating the location on a template of the information. Each information record 424 preferably further includes a style property record child pointer 440 pointing to a style child record table that includes any specific styles names and the placeholder that the information occupies in each indicated specific style. This style property reflects that a given information occupies a different placeholder when an active style name corresponds to a style name in the style property record 440. The style property functions as a search specification or query condition, limiting the display of the information to the placeholder in the style property record 440 when a user selected style name matches a style name in the style property record, and to the default placeholder specified in the placeholder record 436 when a user selected style name does not match a style name if any in the style property record 440 when executed at runtime by the compiling program discussed with reference to FIG. 1, block 124. At runtime, the compiling program checks the style property record 440 to see if there are any placement modifications to make for the current style name, before rendering the information into a specific display template Each information record 224 preferably further includes a mode record 444 that indicates the mode in which the information is displayed, and in the preferred embodiment whether the information is displayed only in the more mode. At runtime, the compiling program checks the mode record 444 for any mode information to select the information to be placed in a specific information display template Referring now to FIG. 5, an embodiment of a program includes in block 510 an input from a computing system indicating that a user has selected an information display position for an information, preferably by a drag and drop operation as described with reference to FIG. 1, blocks 104 and 108. In decision block 520, a computer executing the program determines whether the selected information display name (identification) refers to all information displays supported by the multi-information display template, as preferably input from an interactive user interface. The source of whether the current information display refers to all information displays is input by a user selection of the information display in preferably an interactive input display selection device as described with reference to FIG. 9. If the determination in block 520 is that the information display refers to all information displays, program control passes to block 530. In block 530, a child table record 424 is created for the multi-information display template file for the information with the following values: Item ID=ID of Placeholder, Expression=Null, Markup Language=Current Markup Language, Information=Name (identification) of Information Selected (or in this embodiment dragged to a placeholder); wherein "Expression" refers to the expression property 428, and "ID" refers to the identification of the placeholder record 436, each discussed with reference to FIG. 4. If the determination in block 520 is that the information does not pertain to all information displays, control passes to decision block 540. In decision block 540, a computer executing the program determines whether there is already a child table 240 for the multi-information display template file with the same ID as the placeholder with Expression=The Negation of the information display (or "not information display") and Markup/display Language=Current Markup Language. If the determination in block 540 is that there is not already a child table record 424 with the setting enumerated in reference to decision block 540, program control passes to block 550 in which a child table record 424 is created with the following properties: Item ID=ID of Placeholder, Expression=the information display identifier, Markup/display Language=Current Markup Language, and Information=Name (identification) of Information Selected (or in the embodiment dragged to a placeholder). If the determination in block 540 is that there is already a child table record 424 with the setting enumerated in reference to decision block 540, program control passes to block 560 in which the child table record 424 enumerated Expression value is changed to the information display identifier and the Information is set to the Name (identification) of the Information Selected (or in the embodiment dragged to a placeholder).

Figure 6:
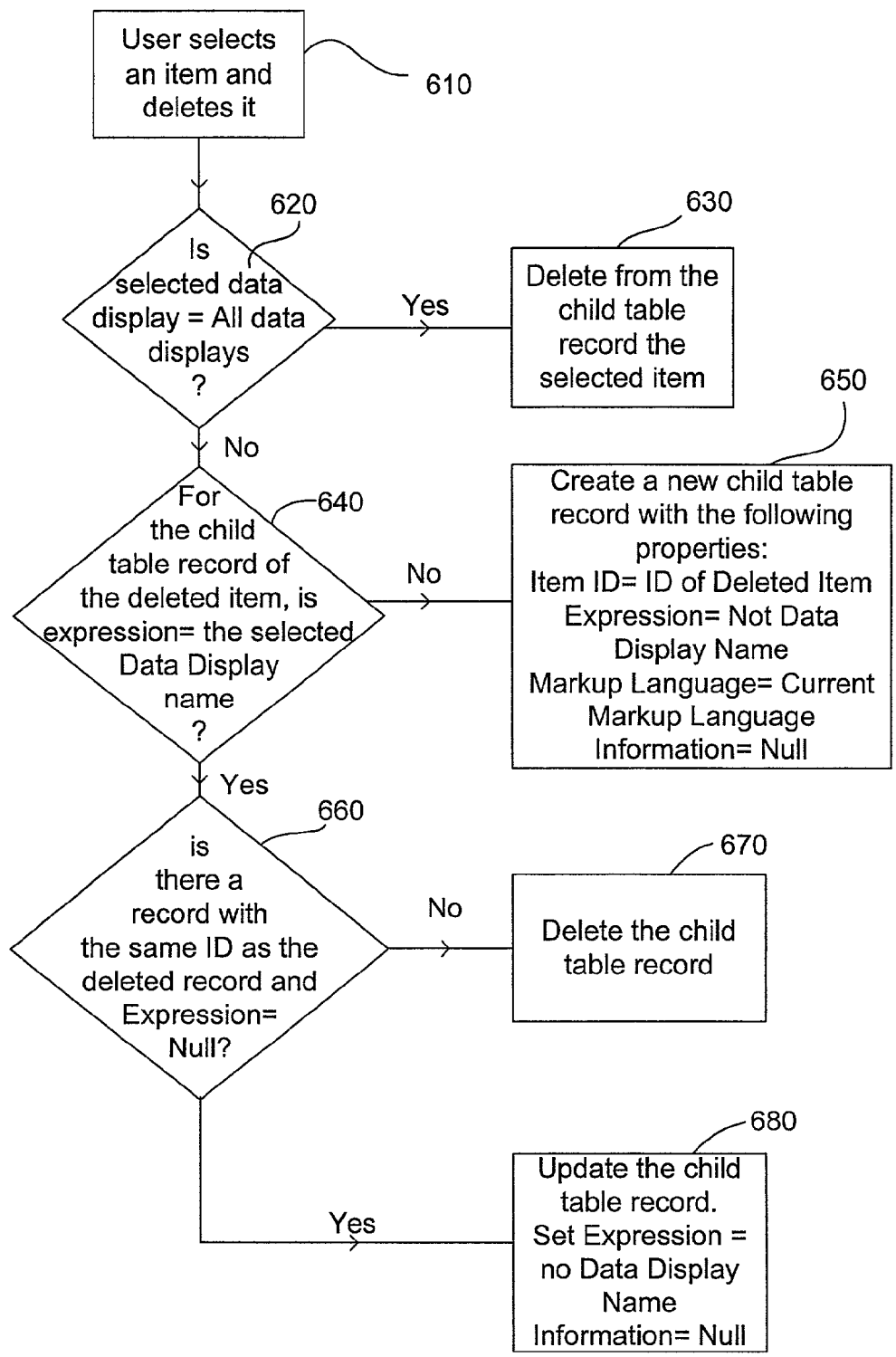
FIG. 6 portrays a flow chart of an embodiment of the program steps to maintain the multi-information display template child table for a user deleting an information from an information display (data display). The order of description should not be construed as to imply that these operations are necessarily order dependent.

Referring now to FIG. 6, an embodiment of a program includes in block 610 an input from a computing system indicating that a user has selected a multi-information display template file information and deleted the multi-information display template file information. In decision block 620, a computer executing the program determines whether the current selected information display refers to all information displays. If the determination in block 620 is that information display identifier is all information displays, that is whether the change is to apply to all information displays, program control passes to block 630 in which the child table record 424 is deleted for the information. If the determination in block 620 is that information display identifier is not all information displays, that the change does not apply to all information displays, program control passes to decision block 640. In decision block 640, a computer executing the program determines whether for the child table record 424 for the deleted information of block 610, Expression=information display identifier, that is whether the record is for the information display currently selected. If the determination in block 640 is that the record is not for the information display selected, program control passes to block 650. In block 650, a new child table record 424 is created for the information with Item ID=Placeholder ID of the deleted item, Expression=Not information display identifier, Markup/display Language Current Markup Language, and Information=Null. If the determination in block 640 is that the record is for the information display selected, program control passes to decision block 660. In decision block 660, a computer executing the program determines whether there is a child table record with the same ID as the deleted record and Expression=Null. If the determination in block 660 is that there is not a child table record with the same ID as the deleted record and expression null, program control passes to block 670 where the child table record is deleted. If the determination in block 660 is yes, program control passes to block 680 where the child table record 424 is updated by setting Expression=Not information display name (identifier), and Information=Null.

Figure 5:
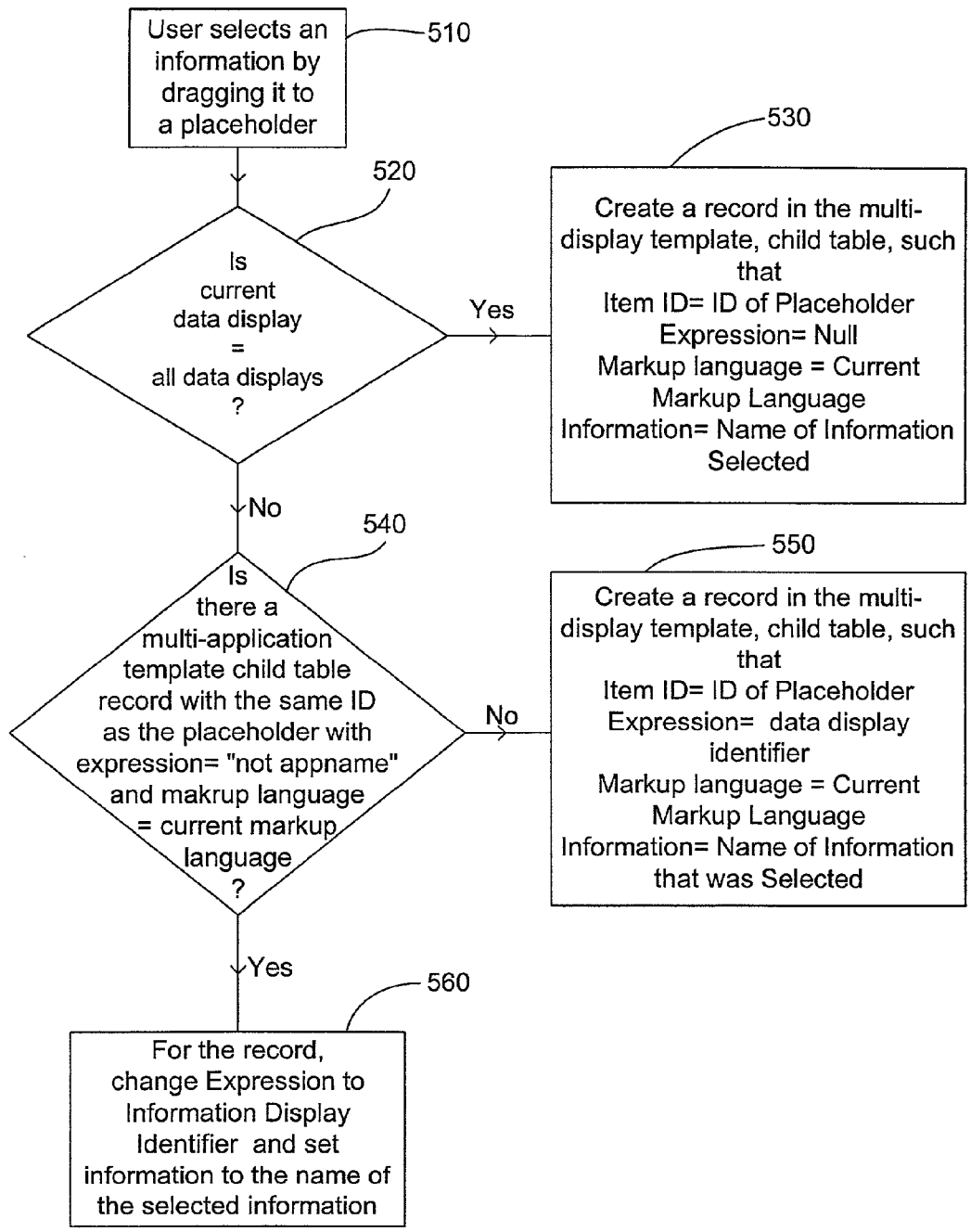
FIG. 5 portrays a flow chart of an embodiment of the program steps to maintain the multi-information display template child table for a user selecting an information to be displayed and the nominal position of that information. The order of description should not be construed as to imply that these operations are necessarily order dependent.
Figure 7:
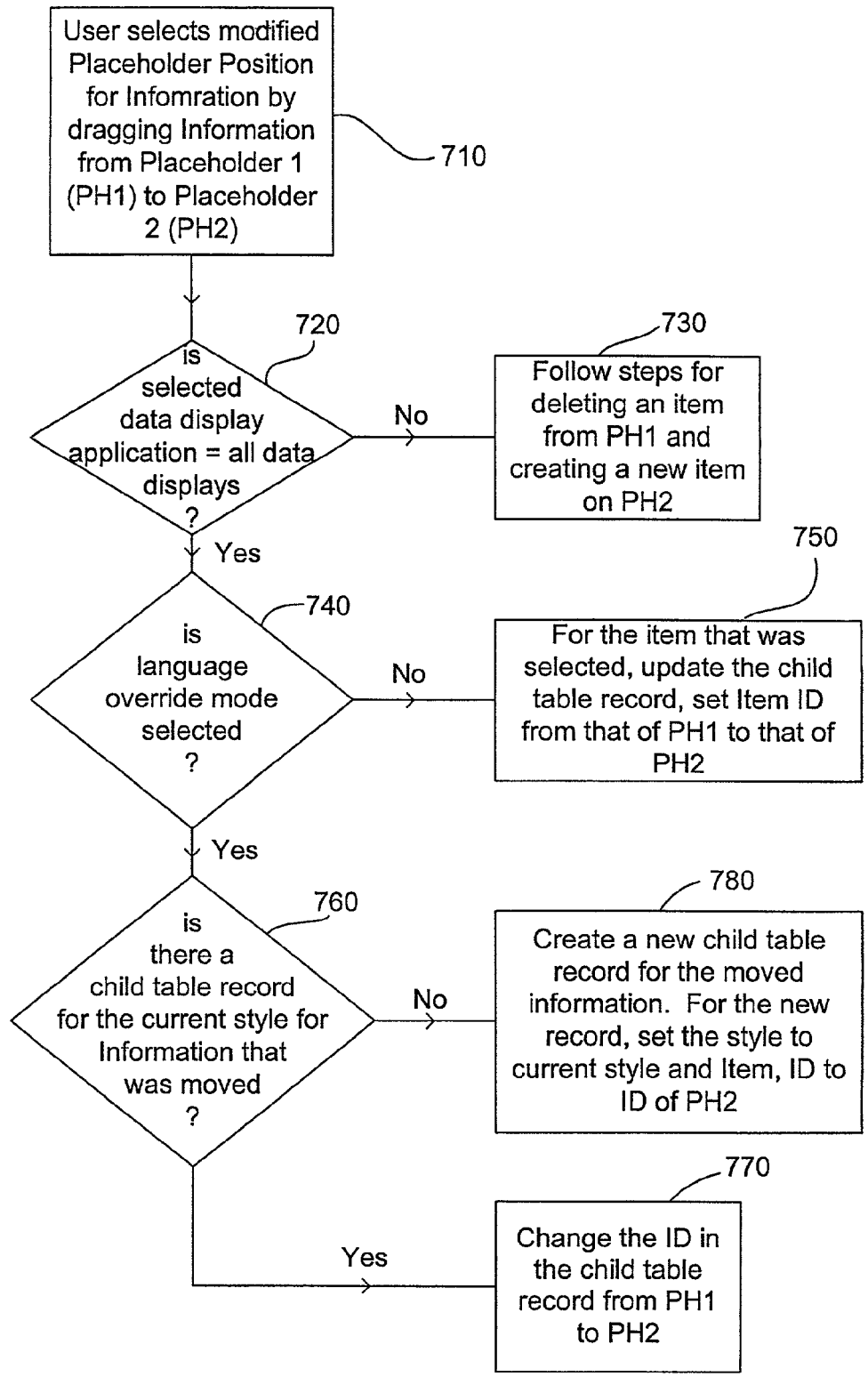
FIG. 7 portrays a flow chart of an embodiment of the program steps to maintain the multi-information display template child table for a user selecting a changed position on an information display (data display) for an information. The order of description should not be construed as to imply that these operations are necessarily order dependent.

Referring now to FIG. 7, an embodiment of a program includes in block 710 an input from a computing system indicating that a user has changed the position of an information from one place on an information display to another place, preferably embodied as a user dragging an information from a first placeholder (PH1) to a second placeholder (PH2). In decision block 720, a computer executing the program determines whether the information display is set to all information displays, that is whether the position change in the information is to apply to all information displays. If the changed position does not apply to all information displays in decision block 720, program control passes to block 730 where the method to delete an item from PH1 portrayed with reference to FIG. 6 is executed, and the method to create another item on PH2 portrayed with reference to FIG. 5 is executed. If the changed position does apply to all information displays in decision block 720, program control passes to decision block 740. In decision block 740, a computer executing the program determines whether the style selected is an override selection, wherein a specific style name has been selected (as contrasted to the default mode for all style names). If the determination in block 740 is that a style (or language) override mode has not been selected, program control passes to block 750 where for the information that has been user selected to have a changed position, the child table record 424 is updated by modifying the Item ID from PH1 to PH2. If the determination in block 740 is that a style (or language) override mode has been selected, program control passes to decision block 760 where a computer executing the program determines whether a child table record 424 has a child for the current style. If the determination in decision block 760 is that the child table does have a child for the current style, program control passes to block 770 where the ID is changed from PH1 to PH2. If the determination in decision block 760 is that there is no child for the current style, program control passes to block 780 where a new child is created having the new ID PH2 and the style property set to the current style.

Figure 8:
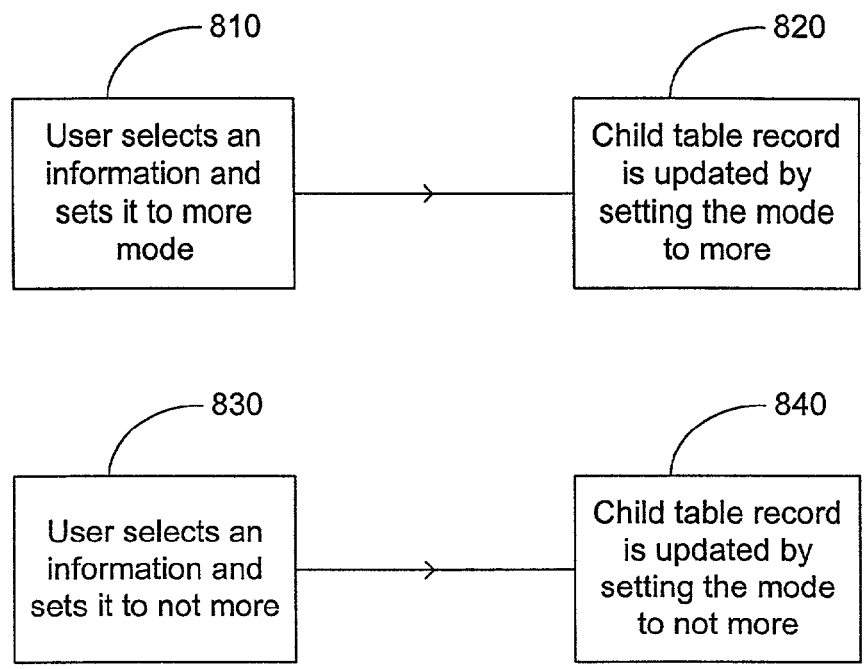
FIG. 8 portrays a flow chart of an embodiment of the program steps to maintain the multi-information display template child table for a user selecting a display mode setting on an information display (data display) for an information. The order of description should not be construed as to imply that these operations are necessarily order dependent.

Referring now to FIG. 8, an embodiment of a program includes in block 810 an input from a computing system indicating that a user has selected an information and set it to More. In block 820 for the selected information, the child table record 424 is updated by setting the mode record 444 to More. It is specifically within the contemplation of the present invention that both a position on an information display, and an information, can each have the mode capability. In block 830, an embodiment of a program includes an input from a computing system indicating that a user has selected an information and set it to not more. In block 840 for the selected information, the child table record 424 is updated by setting the mode record to Null.

Figure 9:
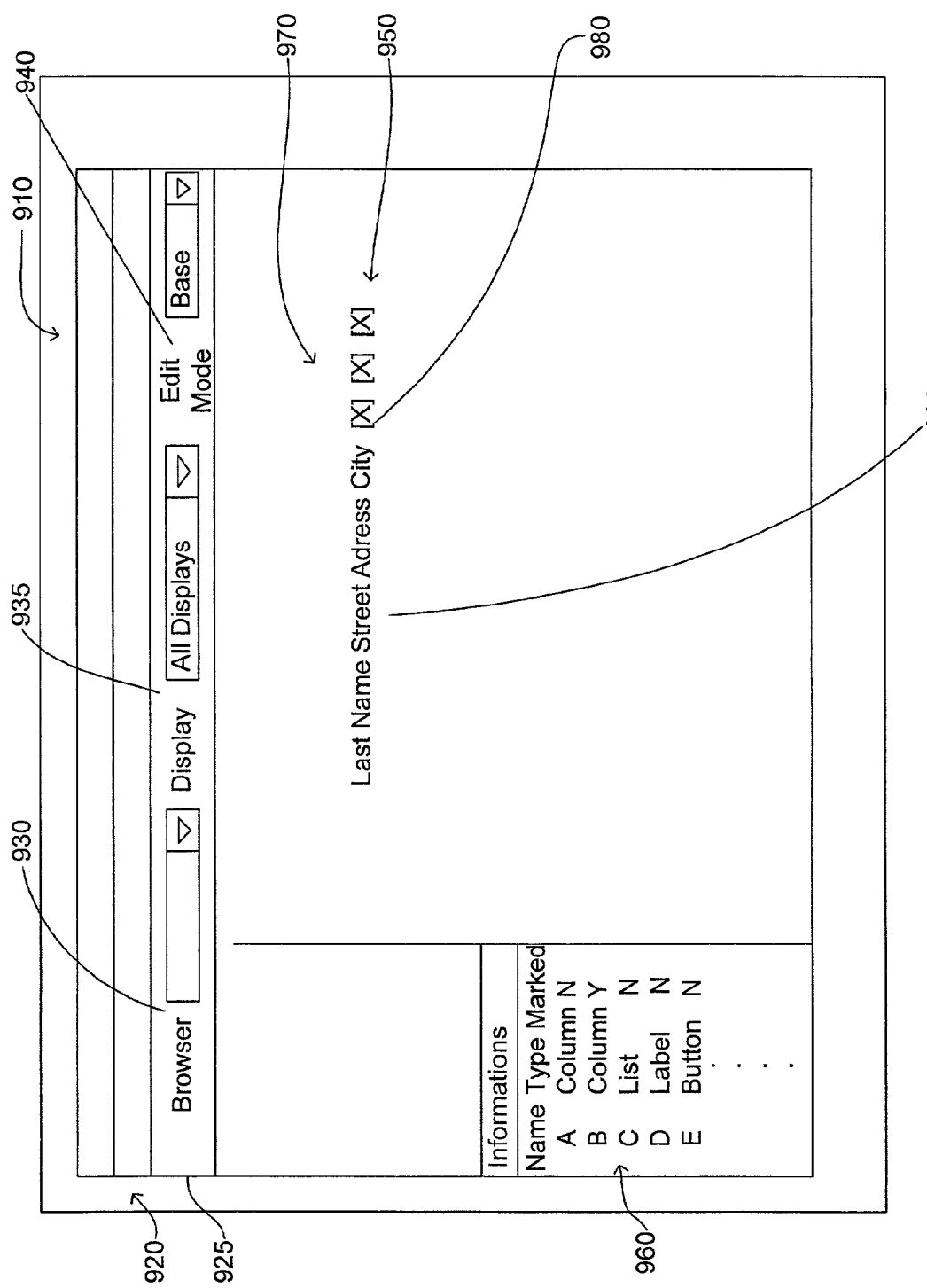
FIG. 9 portrays an embodiment of a layout editor display for inputting information display data (data display) into a system.

Referring now to FIG. 9, an illustrative input interactive layout editor display 910 for inputting information display data into a multi-information display template is preferably in the form of a window in order to be consistent with the presently popular MS-Windows™ operating system. The window 910 includes an illustrative toolbar portion 920, the first two rows having icons (not shown) and the third row 925 having a selection indicator for selection of a browser type 930, an information display 935, and a selection window for selection of an edit mode 940, each selection indicator 930, 935 and 940 illustratively portrayed as a drop down box list. The specific multi-information display template is preferably selected by a user through an interactive displayed selector portrayed on a separate display (not shown), but that can alternatively be effected by a selection device on the layout editor display 710, or other mechanisms well known to those skilled in the pertinent art.

The BROWSER selection indicator 930 contains as individual pull down selection items the browser or browser type, or other display generation program, to implement the proper contingent browser capability as well as to load and edit of the multi-information display markup/display language template for a possible markup/display language template specific mapping. The DISPLAY selection indictor 935 contains as individual pull down selection items, a selection for all information displays, and a selection for each of the separate information displays defined for the multi-information display template being edited/created with the displayed editing display 950. It is specifically within the contemplation of the present invention that a new information display can be defined for the multi-information display template by use of a selection entered into a box, and other user interface entry structures well know to those skilled in the pertinent art.

The EDIT MODE selection indicator 940 contains as individual pull down selection items a mode indicator selection e.g. "BASE" that appears in the box of the indicator 940. The EDIT MODE selection indicator 940 gives a choice of two modes, the Base Mode in which all layout changes apply to each defined style name, and the style override mode in which certain informations have a changed order. The specific style can be selected as a pull down selection of the MODE selection indicator 940 box. It is preferred that a separate drop down box list (not shown) be implemented for each individual style name. Subsequent ordering changes apply only to the situation when that style (or language or culture) is active. Illustratively, say in "German" a user wants to switch the first and last names of an information display. The user first changes the style name to "German", by clicking the Change Language button (or View>Options>Language Settings for this and other drop down box lists). Next, the user changes the Edit Mode from Base to Language Override. The user can then open the relevant edit display for the information display, and drag list information from place to place, with the result that these order changes will be reflected in the information display when the user accesses it in the specified style.

The preferred mechanism for toggling between display modes for illustratively the two-state more/less choice is by a pop-up menu triggered by the right hand selection button of a two-button selection device (such as a mouse).

The layout editor display 910 may include a listing of information 960 defined for the applications displayed by the relevant multi-application template. It is preferred that the listing of information 960 be generated onto an information display that is separate from the layout editor display 910, but logically connected so that in operation, an item can be selected on the listing of information 960 and dragged and/or dropped into the layout editor display 910 that is simultaneously displayed on a display device. In operation, a specific information is selected, and dragged to an unoccupied placeholder 970 which are distinguished here with an "x" surrounded by brackets, and drops the information into that placeholder. Similarly, an information (e.g. "street") can be moved from one position to another by a similar drag and drop operation from its layout editor display position 990 to a changed position 980.

Figure 10:
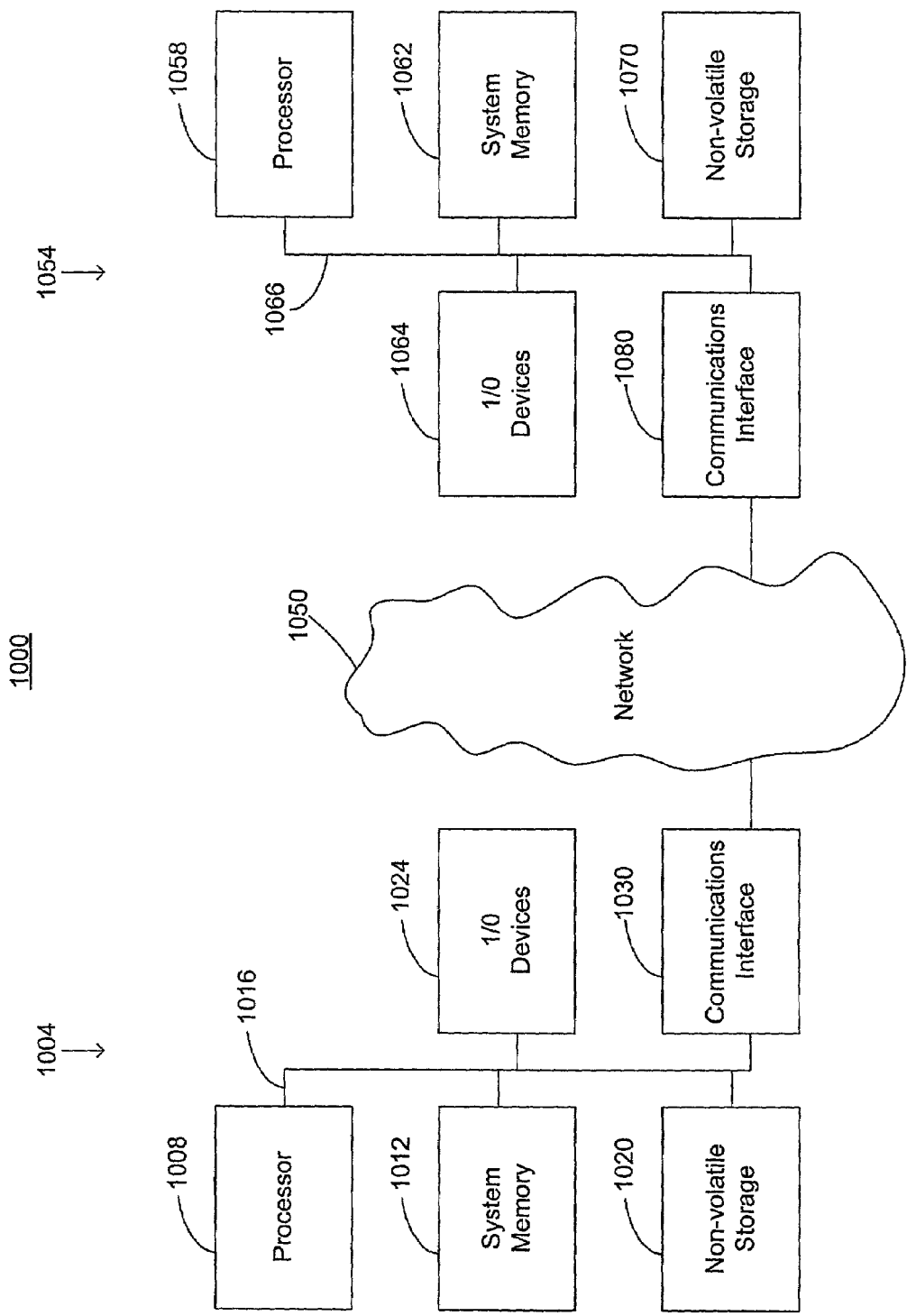
FIG. 10 portrays a system diagram of an embodiment of the present invention to generate a data display from a multi-information display template

FIG. 10 illustrates one embodiment of an exemplary computer system 1000 suitable for use to practice the present invention. As shown, exemplary computer system 1000 includes a computer system 1004 and may include at least one other computer system 1054.

Exemplary computer system 1004 includes a processor system 1008, and a system memory 1012 that may include both a volatile and a non-volatile memory components, functionally coupled to each other via system bus 1016. Functionally coupled also to system bus 1016 are non-volatile storage 1020, various user input/output devices 1024 that specifically may include both a display terminal and a pointing/selection device, and auxiliary memory that may include at least one of a magnetic disk storage media, an optical storage media, a flash memory devices, and an electrical, optical, acoustical or other form of propagated signals. Together, the system memory 1012, the non-volatile storage 1020, and the input/output devices 1010 together include the machine readable medium to store a computing program and data as described above. The computing system 1004 may further include a communications interface 1030 to couple the computing system 1004 to a network 1050 and an at least one coupled computing system 1060.

The computing system 1054 includes a processor system 1058, and a system memory 1062 that may include both a volatile and a non-volatile memory components, functionally coupled to each other via system bus 1066. Functionally coupled also to system bus 1066 are non-volatile storage 1070, various user input/output devices 1064 that specifically may include both a display terminal and a pointing/selection device, and auxiliary memory that may include at least one of a magnetic disk storage media, an optical storage media, a flash memory devices, and an electrical, optical, acoustical or other form of propagated signals. Together, the system memory 1062, the non-volatile storage 1070, and the input/output devices 1064 together may include the machine readable medium to store a computing program and data as described above. The computing system 1054 may further include a communications interface 1080 to couple the computing system 1054 to the network 1050 and at least one coupled computing system 1004. Herein, one of the computing systems 1004 or 1054 may function as a repository of the stored program and data, and as a server; the other of the computing systems 1004 or 1054 may function as a user terminal that furnishes the user interface described herein and may not necessarily store the program and data of the present invention and include the memory described herein, but may instead respond to the program executing on another computing system through the network connections 1030 and 1080 when it is executed on another computing system.

While certain exemplary embodiments have been described and shown in the accompanying drawings, it is to be understood that these embodiments are merely illustrative of and not restrictive of the broad invention. The present invention is not limited to the specific constructions and arrangements shown and described, and alternative embodiments will become apparent to those skilled in the art to which the present invention pertains without departing from the scope of the present invention. The scope of the present invention is defined by the appended claims rather than the foregoing description.

What is claimed is:

1. A computer implemented method of building a plurality of data displays comprises:
   defining, through an interactive process, for each of the plurality of data displays at least one of
      an information presence on the display, the information presence comprising a plurality of information sets, each information set corresponding to one or more of the plurality of data displays, each information set having a corresponding placement, and
      an information placement on each of the plurality of data displays, the information placement specifying one or more new positions for at least a portion of one or more of the information sets;
   defining a data-base entity having each of the defined information placement, and information presence; and
   in response to a user request, dynamically generating a multi-informational display template for the plurality of data displays based upon the data-base entity.

2. The method defined in claim 1 wherein the defining of an information presence is conditional based upon at least one of a display identification and a display mode.

3. The method defined in claim 1 wherein the defining of an information placement is conditional based upon a style.

4. The method defined in claim 1 wherein the data-base entity includes at least one of a conditional display appearance and a conditional placement data.

5. The method defined in claim 1 wherein the data-base entity further includes at least one display tag to be conditionally executed if a display terminal browser requesting a data display has a capability to support the display tag; and the generating further includes generating only each display that is supported by the display terminal browser.

6. The method defined in claim 1 further including displaying a data display from the display template.

7. The method defined in claim 1 wherein the defining for each of the plurality of data displays is based on user input via a computer interface.

8. The method defined in claim 1 wherein the defining for each of the plurality of data displays is based on user input via a display interface.

9. The method defined in claim 1 wherein the defining for each of the plurality of data displays is based on user input via an interactive display layout.

10. The method defined in claim 1 wherein the defining an information presence includes at least one of defining a presence for all data displays, and a logical combination of at least one of a specific data display and not a specific data display.

11. The method defined in claim 1 wherein the defining an information placement includes at least one of defining a placement for all data displays, and a logical combination of at least one of a specific data display and not a specific data display.

12. The method defined in claim 1 wherein the defining an information placement includes modifying the placement of an information on an at least one specified data display.

13. The method defined in claim 1 wherein the information display placement includes defining a placement for at least one placement style.

14. The method defined in claim 1 wherein the defining an information appearance includes selecting an information to appear and not appear according to at least one mode.

15. The method defined in claim 1 wherein the data-base entity includes a record for each of at least one markup/display languages.

16. The method defined in claim 1 wherein the data-base entity includes a record that has data that indicates the data displays that the information appears on.

17. The method defined in claim 1 wherein the data-base entity includes a pointer to a record that has data that indicates the modes for which each of the data will appear on a data display.

18. The method defined in claim 1 wherein the data-base entity includes a record that indicates a position of each data for each data display.

19. The method defined in claim 1 wherein the data-base entity includes one of markup/display language statements and position tags.

20. The method defined in claim 19 wherein the data-base entity includes tags that have a position indicator, and a record that indicates the information displayed in each position.

21. The method defined in claim 20 wherein the data-base entity further includes at least one of
at least one mode for which each of the data will appear on the data display,
a set of data displays that each information appears on, and
a position that an information appears in a specific style.

22. A computer system comprising:
a processor; and
a memory coupled to the processor to store instructions, which, when executed, cause the processor
to input into a multi-display database an identification information, the identification information comprising a plurality of information sets-appearing on a plurality of distinct data displays, each information set having a corresponding placement;
to input into the multi-display database a placement data, the placement data specifying one or more new positions for at least a portion of one or more information sets information;
to implement and maintain the database depending upon the identification information and the placement data; and
to dynamically generate a multi-informational display template for the plurality of distinct data displays in response to a user request, based upon the identification information and the placement data.

23. The computer system defined in claim 22, wherein the instructions, when executed, further cause the processor
to generate an input interactive display for inputting by a user of an identification of information to appear on the plurality of distinct data displays and a placement of the information to appear on the data displays;
wherein the processor inputs the information to appear on the plurality of data displays, and the placement of the information to the database.

24. The computer system defined in claim 23 wherein the interactive display is sent to a network-coupled computer system.

25. The computer system defined in claim 22, wherein the instructions, when executed, further cause the processor
to receive from a user into the memory the identification of information that is each to appear on the plurality of data displays, and
to receive the identification of information from the memory.

26. The computer system defined in claim 22, wherein the instructions, when executed, further cause the processor to receive from a user into the memory the placement of each of the information of the information that is to appear on the data displays, and
to receive the placement data from the memory.

27. The computer system defined in claim 22 wherein the placement data is contingent upon a style that is user input.

28. The computer system defined in claim 22 wherein the identification of information is contingent upon each data display that is user input.

29. The computer system defined in claim 22 wherein the identification of information is contingent upon a display mode of each information that is user input.

30. The computer system defined in claim 22 wherein the multi-display database includes a common template for each data display that has a contingent display capability for at least one of the information, and a contingent placement capability for at least one of the information.

31. The computer system defined in claim 22, wherein the instructions, when executed, further cause the processor to implement and maintain the database to have contingent appearance information and to have contingent placement information.

32. The computer system defined in claim 31 wherein the contingent appearance data depends upon a display mode and a display identification.

33. The computer system defined in claim 31 wherein the contingent placement data depends upon a style identification.

34. The computer system defined in claim 22 wherein the instructions, when executed, further cause the processor to implement and maintain more than one record, each record having markup/display instructions in a separate language, and to generate a display template having one of the markup/display languages according to a user generated selection.

35. The computer system defined in claim 22, wherein the database includes at least one display tag to be conditionally executed if a display terminal browser requesting a data display has a capability to support the display tag; and the instructions, when executed, further cause the processor to generate each data display from the database based upon the capability of a user selected browser by conditionally executing the display tag based upon the user selected browser.

36. The computer system defined in claim 22, wherein the instructions, when executed, further cause the processor to send the display template to a network.

37. A machine-readable medium that provides instructions, which when executed by a processor, cause the processor to perform operations comprising:
inputting into a multi-display database an identification information, the identification information comprising a plurality of information sets appearing on a plurality of distinct data displays, each information set having a corresponding placement through an interactive process;
inputting into the multi-display database a placement data, the placement data specifying one or more new positions for at least a portion of one or more of the information sets information through an interactive process;
implementing and maintaining the information in the database depending upon the inputs from the display appearance input instructions and the display placement input instructions; and
in response to a user request, dynamically generating a multi-informational display template for the plurality of distinct data displays based upon the identification information and the placement data.

38. The medium defined in claim 37 wherein the operations include:
generating an input interactive display for inputting by a user of an identification of information to appear on the plurality of distinct data displays and a placement of the information to appear on the data displays;
wherein the display appearance input instructions input the information to appear on the plurality of data displays to the database, and the display placement instructions input the placement of the information to the database.

39. The medium defined in claim 38 wherein the operations include sending the interactive display to a network-coupled computer system.

40. The medium defined in claim 37 wherein the operations include receiving from an interface the identification of information that is each to appear on the at least one data displays.

41. The medium defined in claim 37 wherein the operations include receiving from an interface the placement of each of the information of the information that is to appear on the data displays.

42. The medium defined in claim 37 wherein the inputting a placement of data is based upon a style that is user input.

43. The medium defined in claim 37 wherein the inputting an identification of information that is each to appear is based upon each data display that is user input.

44. The medium defined in claim 37 wherein the inputting an identification of information to appear is based upon a display mode of each information that is user input.

45. The medium defined in claim 37 wherein the operations include generating a common template for each data display that has a contingent display capability for at least one of the information, and a contingent placement capability for at least one of the information.

46. The medium defined in claim 37 wherein the instructions for implementing and maintaining the database generate contingent appearance information and contingent placement information in the database.

47. The medium defined in claim 46 wherein the contingent appearance data is based upon a display mode and a display identification.

48. The medium defined in claim 46 wherein the contingent placement data is based upon a style identification.

49. The medium defined in claim 37 wherein the operation of implementing and maintaining the database include implementing and maintaining more than one record, each record having markup/display instructions in a separate language and wherein the display template generation instructions are to generate a display template having one of the markup/display languages according to a user generated selection.

50. The medium defined in claim 37 wherein the database includes at least one display tag to be conditionally executed if a display terminal browser requesting a data display has a capability to support the display tag; and the generating a display template operations further include operations generating each data display from the database based upon the capability of a user selected browser by conditionally executing the display tag based upon the user selected browser.

51. The medium defined in claim 37 wherein the operations further include sending the display template to a network-coupled computer.

* * * * *